US008878139B2

(12) United States Patent
Kono et al.

(10) Patent No.: US 8,878,139 B2
(45) Date of Patent: Nov. 4, 2014

(54) NEUTRON MEASUREMENT APPARATUS AND NEUTRON MEASUREMENT METHOD

(71) Applicant: Kabushiki Kaisha Toshiba, Tokyo (JP)

(72) Inventors: Shigehiro Kono, Tama (JP); Makoto Tomitaka, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 82 days.

(21) Appl. No.: 13/780,516

(22) Filed: Feb. 28, 2013

(65) Prior Publication Data

US 2013/0221231 A1 Aug. 29, 2013

(51) Int. Cl.
*G01T 3/00* (2006.01)

(52) U.S. Cl.
CPC .......................... *G01T 3/00* (2013.01)
USPC ......................................................... 250/391

(58) Field of Classification Search
CPC ...... G01N 23/025; G01T 3/00; G06F 17/142; G21C 17/00
USPC .......... 250/391, 290.01–390.12, 269.1–269.8
See application file for complete search history.

(56) References Cited

U.S. PATENT DOCUMENTS

| 4,475,038 | A | * | 10/1984 | Lochmann et al. | ......... | 250/269.6 |
| 5,196,698 | A | * | 3/1993 | Schneider | ...................... | 250/262 |
| 5,251,708 | A | * | 10/1993 | Perry et al. | ...................... | 175/41 |
| 6,181,761 | B1 | * | 1/2001 | Izumi et al. | ................... | 376/254 |
| 6,564,194 | B1 | * | 5/2003 | Koza et al. | ...................... | 706/13 |
| 6,723,929 | B2 | * | 4/2004 | Kent | .......................... | 178/18.04 |
| 7,117,186 | B2 | * | 10/2006 | Koza et al. | ...................... | 706/13 |
| 2002/0188423 | A1 | * | 12/2002 | Gross et al. | .................... | 702/182 |
| 2003/0164820 | A1 | * | 9/2003 | Kent | .............................. | 345/177 |
| 2004/0030414 | A1 | * | 2/2004 | Koza et al. | ........................ | 700/1 |
| 2007/0211928 | A1 | * | 9/2007 | Weng et al. | .................... | 382/128 |
| 2008/0204270 | A1 | * | 8/2008 | Aiello et al. | ................ | 340/855.4 |
| 2010/0198542 | A1 | * | 8/2010 | Troxler | ........................... | 702/85 |
| 2012/0085899 | A1 | * | 4/2012 | Troxler et al. | ................. | 250/253 |

FOREIGN PATENT DOCUMENTS

| JP | 59-10888 | 1/1984 |
| JP | 59-21111 | 2/1984 |
| JP | 7-159544 | 6/1995 |

* cited by examiner

*Primary Examiner* — Kiho Kim
(74) *Attorney, Agent, or Firm* — Oblon, Spivak, McClelland, Maier & Neustadt, L.L.P.

(57) ABSTRACT

A neutron measurement apparatus includes: an analog signal processor; a digitizing processor; an FFT calculation processor; and a signal processor. The analog signal processor amplifies alternating current components of detector output signals output from a neutron detector, and filters to remove high frequency components from the output signals, which the digitizing processor digitizes at a constant sampling period in a time series; the FFT calculation processor converts certain of the signals in a time domain from the digitizing processor into signals in a frequency domain, and filters the signals in the frequency domain; and the signal processor selects and extracts signals having required frequency components through the calculation processing on the FFT calculation processor, to calculate power spectral densities of the extracted signals, and to convert the calculated power spectral densities into a neutron measurement value.

13 Claims, 7 Drawing Sheets

NEUTRON MEASUREMENT APPARATUS AND NEUTRON MEASUREMENT METHOD

CROSS-REFERENCE TO RELATED APPLICATIONS

This application is based upon and claims the benefit of priority from Japanese Patient application No. 2012-043995, filed on Feb. 29, 2012, the entire contents of each of which are incorporated herein by reference.

BACKGROUND OF THE INVENTION

1. Field of the Invention

Embodiments of the preset invention relate to a measurement technique to measure neutrons generated in a nuclear fission reactor and a nuclear fusion reactor.

2. Description of the Related Art

Neutrons generated in a nuclear fission reactor of a light-water reactor in a commercial nuclear power plant are measured by use of fission counter tubes because of their excellent discrimination performance to discriminate neutrons from gamma rays. In a state of a low reactor power, output signals from the fission counter tubes are measured as pulse signals. In a state of a relatively high reactor power, the output signals from the fission counter tubes cannot be individually measured because the pulse signals are overlapped with each other. For this reason, the neutrons are measured with the Campbell's method of utilizing statistical fluctuations of detector output signals (for example Japanese Patent Laid-Open No. 59-21111).

In nuclear fusion reactors, duration time of nuclear fusion reactions of heavy hydrogen (D-D reaction) has been enhanced thanks to recent technical developments, and the number of neutrons generated by the D-D reaction has been increased. Hence, in the measurement of neutrons generated from a nuclear fusion reactor using fission counter tubes, it has been required to use the measurement domain of the Campbell's method beyond the pulse measurement domain.

It has been well known that accuracy of a measurement result with the Campbell's method is proportional to a time constant of an averaging circuit in an output stage of a measurement apparatus.

Meanwhile, enhancement of performances of microprocessors (MPU) and digital signal processors (DSP) facilitate implementation of digital signal processing technologies to real neutron measurement apparatuses. Particularly, in signal processing using the fast Fourier transform (FFT), it is possible to realize optimum filtering characteristics that cannot be realized by conventional analogue filtering.

In the neutron measurement with the Campbell's method, a root mean square calculation is applied to input signals so as to calculate statistical fluctuations of detector output signals, and thus this neutron measurement is often subjected to influences of noise signals if the noise signals are overlapped with the input signals.

Recently, in order to prevent influences on neutron measurement apparatuses of high-frequency noises of approximately 1 MHz, for example, which are generated by inverters that have recently been used in power source apparatuses or electric motors, such noise-prevention is required for neutron measurement apparatuses that reinforce shields of their measurement systems, or provide ferrite cores in their noise propagating paths, for example.

In conventional neutron measurement apparatuses, a signal processing circuit for processing detector output signals (analogue signals) from a neutron detector 1 is provided with a preamplifier 2, an AC (alternating current) amplifier 3 and an analogue filter device 4, a square calculating circuit 5, and a time constant circuit 6, so as to apply filtering to the input signals and the output signals for the noise prevention, as shown in FIG. 8.

In conventional analogue filters, infinite impulse response (IIR) filters or finite impulse response (FIR) filters that perform digital filtering in the time domain, it is impossible to realize perfect filtering characteristic, and it is difficult to completely remove influences of noises.

SUMMARY OF THE INVENTION

An object of the present invention, which has been made in order to solve the problems according to the conventional art, is to provide a neutron measurement apparatus and a neutron measurement method capable of quickly and accurately obtaining a neutron measurement value from fast Fourier transform (FFT)-processed signals in the frequency domain without receiving influences of noise components.

Another object of the present invention is to provide a neutron measurement apparatus and a neutron measurement method capable of overcoming time delay due to calculation by eliminating the inverse fast Fourier transform (iFFT) processing after the fast Fourier transform (FFT) processing during the neutron measurement, thereby enhancing implementation to circuit substrates constituting the apparatus.

The neutron measurement apparatus according to the present invention has been made in order to solve the above described problems, and this neutron measurement apparatus includes: an analogue signal processing system; a digitizing processing system; an FFT calculation processing system; and a signal processing system, wherein the analogue signal processing system amplifies alternating current components of detector output signals output from a neutron detector, and applies filtering to remove high frequency components from the output signals; the digitizing processing system digitizes the output signals output from the analogue signal processing system at a constant sampling period in a time series; the FFT calculation processing system converts a certain number of the signals in a time domain output from the digitizing processing system into signals in a frequency domain, and applies filtering to the signals in the frequency domain; and the signal processing system selects and extracts signals in a required frequency domain through the calculation processing on the FFT calculation processing system, so as to calculate power spectral densities of the extracted signals, and to convert the calculated power spectral densities into a neutron measurement value.

The neutron measurement apparatus according to the present invention has been made in order to solve the above described problems, and this neutron measurement apparatus includes: a neutron detector for detecting neutrons; a preamplifier for amplifying detector output signals from the neutron detector; an AC amplifier for amplifying alternating current components of the signals output from the preamplifier; an analogue filter device for removing high frequency components from the signals output from the AC amplifier; an AD converter for AD-converting the output signals from the analogue filter device at a constant sampling period into digital signals; a recorder for recording the digital signals converted on the AD converter; a window function multiplier for reading out a certain number of the digital signals from the recorder, and multiplying the digital signals by window function coefficients; an FFT device for applying fast Fourier transform processing to the output signals from the window function multiplier; a signal selecting device for selecting and extracting only signals having required frequency components based on a calculation result of the FFT device; a power spectral density calculator for calculating power spectral densities of the signals selected and extracted on the signal selecting device; and a neutron signal converter for converting the output signals from the power spectral density calculator into a neutron measurement value.

The neutron measurement method according to the present invention has been made in order to solve the above described problems, and this neutron measurement method includes: amplifying only alternating current components of detector output signals output from a neutron detector, and applying filtering to the output signals to remove high frequency components from the output signals on an analogue signal processing system; digitizing the processed detector output signals at a constant sampling period in a time series on a digitizing processing system; applying fast Fourier transform (FFT) processing to the digitized signals in a time domain into signals in a frequency domain on an FFT calculation processing system, and applying filtering to the FFT-processed signals in the frequency domain; and selecting and extracting signals having required frequency components from the FFT-processed signals in the frequency domain, so as to calculate power spectral densities of the extracted signals, and obtain a neutron measurement value based on the power spectral densities of the extracted signals.

The neutron measurement apparatus using the Campbell measurement apparatus for measuring neutrons with the Campbell's method focuses on that statistical fluctuation of detector-output signals from a neutron detector is equivalent to the power spectrum, and an autocorrelation function with no time delay is equivalent to a root mean square value, and it has been found that a fast Fourier transform (FFT)-processed signal in the frequency domain is unnecessary to be converted into the signal in the time domain through the inverse fast Fourier transform (iFFT) processing.

Specifically, if applying the principle of the time invariant system to the Wiener-Khinchin theorem stating that "the Fourier transform of autocorrelation of any signal is equal to the power spectrum", it can be interpreted that "the iFFT of the power spectrum is equal to the autocorrelation function."

If the findings: "the iFFT of the power spectrum is equal to the autocorrelation function" and "autocorrelation with no time delay is equal to a root mean square value of any signal" are applied to the Campbell's method, the FFT-processed signal in the frequency domain is filtered, and thereafter the power spectral density calculation is applied to this filtered signal in the frequency domain without applying the iFFT processing, so as to obtain a value equivalent to a root mean square value obtained through the iFFT processing and the root mean square calculation. It has successfully been verified that the neutron measurement value obtained based on the power spectral density is equal to the neutron measurement value obtained based on the root mean square value.

The neutron measurement apparatus and the neutron measurement method of the present invention employ the FFT processing in the neutron measurement, so as to convert the power spectral densities of FFT-processed signals in the frequency domain to obtain a neutron measurement value, thereby realizing quick and accurate neutron measurement without including noise components.

In the present invention, it is possible to obtain a neutron measurement value based on the power spectral density of a signal in the frequency domain without converting the FFT-processed signal in the frequency domain into the signal in the time domain through the iFFT processing. Accordingly, it is unnecessary to implement the iFFT device, thereby enhancing implementability to the circuit substrates.

DETAILED DESCRIPTION OF PREFERRED EMBODIMENTS

With reference to attached drawings, description will be provided on the embodiments of the present invention.

First Embodiment

Figure 1:
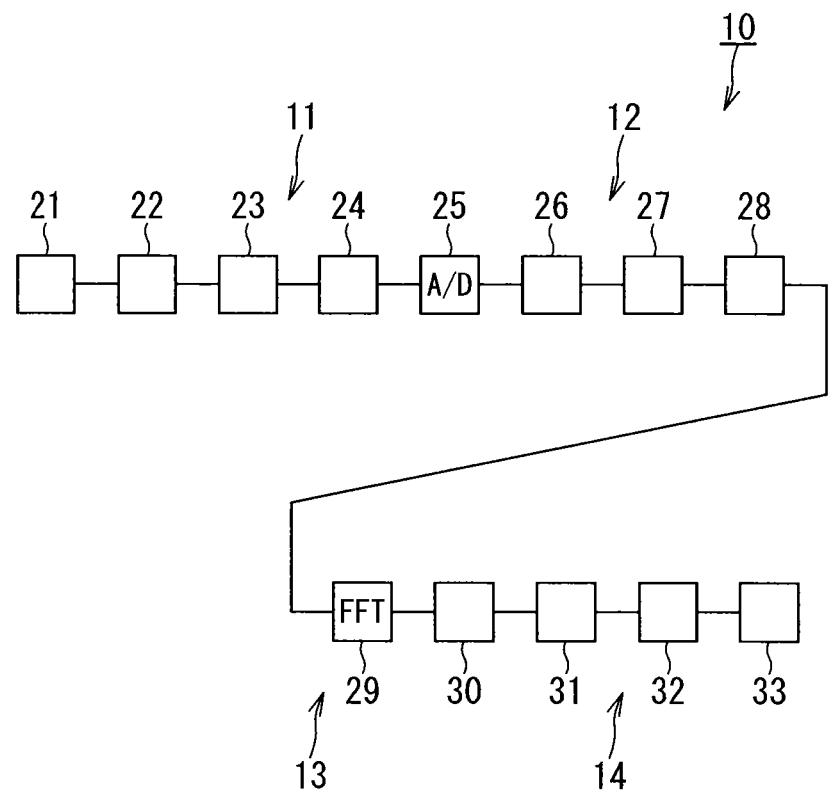
FIG. 1 is a schematic diagram showing a first embodiment of a neutron measurement apparatus and a neutron measurement method according to the present invention.

FIG. 1 is a schematic diagram showing a first embodiment of a neutron measurement apparatus and a neutron measurement method.

The neutron measurement apparatus and the neutron measurement method exemplified in the present embodiment are used in measurement of neutrons generated in a nuclear fission reactor such as a light-water reactor and a nuclear fusion reactor in a nuclear power plant.

A neutron measurement apparatus 10 shown in FIG. 1 is applied to a Campbell measurement apparatus for measuring neutrons with the Campbell's method. This neutron measurement apparatus 10 focuses on that statistical fluctuation of detector output signals from a neutron detector is equivalent to the power spectrum, and performs the neutron measurement based on the following new findings that the detector output signal in the time domain is processed through the fast Fourier transform (FFT) into a signal in the frequency domain, and thereafter, the signal in the frequency domain is filtered, and this filtered signal in the frequency domain is unnecessary to be converted into the signal in the time domain through the inverse fast Fourier transform (iFFT) processing for the neutron measurement. This neutron measurement apparatus 10 is configured to obtain a value equivalent to a root mean square value of the signals in the time domain from a neutron detector by calculating power spectral densities of the FFT-processed signals in the frequency domain without applying the iFFT processing to the signals in the frequency domain, thereby quickly and accurately measuring the neutron measurement value.

The neutron measurement apparatus 10 of the present embodiment mainly includes an analogue signal processing system 11 serving as a detector of a conventional Campbell measurement apparatus, and a signal processing circuit for applying filtering to output signals detected from this detector, a digitizing processing system 12 for digitizing in a time series the filtering-processed output signals whose high-frequency components are removed on the signal processing system 11, an FFT calculation processing system 13 for applying the fast Fourier transform (FFT) processing to the digitized signals in the time domain so as to convert the signals in the time domain into the signals in the frequency domain, and a signal processing system 14 for calculating power spectral densities of the signals in the frequency domain based on the calculation result of the FFT, thereby obtaining the neutron measurement value.

In the neutron measurement apparatus 10 of the first embodiment, the analogue signal processing system 11 includes a neutron detector 21 for detecting neutrons, a preamplifier 22 for amplifying a weak detector output signal having statistical fluctuation, an AC amplifier 23 for amplifying only alternative current components of the output signals from the preamplifier 22, and an analogue filter device 24 for removing high-frequency components from the signals having the alternative current components output from the AC amplifier 23.

The output signals which are filtered and whose high-frequency components are removed on the analogue filter device 24 are forwarded to the digitizing processing system 12. The digitizing processing system 12 includes an AD converter 25 for AD-converting the output signals from the analogue filter device 24 at a constant sampling period, a first recorder 26 for recording the digital signals converted on this AD converter 25, a window function multiplier 27 for reading out a certain number of the digital signals from the recorder 26 and multiplying the digital signals by window function coefficients, and a second recorder 28 for recording the output signals multiplied on the window function multiplier 27, and each signal is then forwarded to the FFT calculating processing system 13.

The FFT calculation processing system 13 includes an FFT device 29 for applying the fast Fourier transform (FFT) to the output signals from the window function multiplier 27, and a third recorder 30 for recording calculation results of the FFT device 29. The FFT device 29 applies the FFT processing to the signal in the time domain so as to convert them into the signals in the frequency domain, and thereafter filters the signals in the frequency domain to remove high-frequency noise components of approximately 1 MHz from the signals.

The signal processing system 14 of the neutron measurement apparatus 10 includes a signal selecting device 31 for selecting and extracting only signals having required frequency components based on the calculation result of the FFT device 29, a power spectral density calculator 32 for calculating power spectral densities of the signals in the frequency domain selected and extracted on the signal selecting device 31, and a neutron signal converter 33 for converting the output signals from the power spectral density calculator 32 into a neutron measurement value.

[Operation]

The neutron measurement apparatus 10 of the present embodiment generates a detector output signal in a pulse shape if a neutron enters the neutron detector 21. If the number of neutrons entering the neutron detector 21 increases, the detector output signals in a pulse shape are overlapped with each other, so that the signals in a pulse shape cannot be individually discriminated any more, and consequently the detector output signals having the statistical fluctuation are generated, which is same as the occurrence probability distribution of the neutrons that enter the neutron detector 21.

The detector output signals having such statistical fluctuation are very weak, and thus are amplified on the preamplifier 22. The signals amplified on the preamplifier 22 also have the same statistical fluctuation as that of the detector output signals. The AC amplifier 23 extracts and amplifies only the statistical fluctuation components of the output signals output from the preamplifier 22, that is, amplifies only the AC signal components thereof.

The analogue filter device 24 of the analogue signal processing system 11 removes, from the output signal having the AC signal components amplified on the AC amplifier 23, the high frequency components having a frequency half or more of the sampling frequency (Nyquist frequency) of the AD converter 25 in the subsequent step, thereby preventing occurrence of aliasing during the sampling on the subsequent AD converter 25.

The signal having the AC signal components through the analogue filter device 24 to remove the high frequency components are then converted into the digital signals having a constant sampling period in a time series on the AD converter 25. The digital signals having the constant sampling period, digitized on the AD converter 25, is then sequentially recorded on the first recorder 26 of the digitizing processing system 12 in chronological order.

A certain number of the digital signals are read out from the first recorder 26, and then are forwarded to the window function multiplier 27 in the subsequent step. The window function multiplier 27 includes window function coefficients previously calculated, and the window function multiplier 27 applies the window function processing to multiply each digital signal read out from the first recorder 26 by the window function coefficient. The certain number of digital signals subjected to the window function processing are then recorded on the second recorder 28. The second recorder 28 reduces influences caused by cut-out of the finite number of digital signals from the digital signals in the time domain from $-\infty$ to $+\infty$.

The certain number of digital signals subjected to the window function processing on the window function multiplier 27 are cut out from the second recorder 28, and are transmitted to the FFT device 29 of the FFT calculating processing system 13. The FFT device 29 applies the FFT processing to the certain number of digital signals in the time domain so as to convert them into the signals in the frequency domain. Specifically, the certain number of digital signals in the time domain subjected to the window function processing are cut out from the second recorder 28, and the fast Fourier transform is applied to the cut-out digital signals. On the FFT device 29, coefficients in the frequency domain in which the sampling frequency of the AD converter 25 is specified as $2\pi$ (one period) are output by the same number as the number of the digital signals used in the FFT processing (referred to as the "degree of the FFT"), and then applies the frequency conversion processing to the signals using these coefficients, and the converted signals are recorded on the third recorder 30. The signals in the frequency domain converted on the FFT device 29 includes signal components of approximately a hundred kHz to several hundred kHz, or noise components of approximately 1 MHz. Hence, the signals in the frequency domain are subjected to necessary filtering to remove the noise components thereof.

The result of the calculation on the FFT device 29 is input from the third recorder 30 into the signal selecting device 31 of the signal processing system 14. The signal selecting device 31 selects and extracts signals having frequency components corresponding to the frequency response characteristic of the signals in the analogue signal processing system 11 from the neutron detector 21 to the AD converter 25.

The power spectral density calculator 32 of the signal processing system 14 calculates the power spectral densities of the signals selected and extracted on the signal selecting device 31. The power spectral density calculator 32 calculates a sum of squares of the signals having the necessary frequency components selected and extracted on the signal selecting device 31, and thereafter divides the calculated value by the square value of the degree of the FFT, so as to obtain the power spectral density.

The output signal from the power spectral density calculator 32 is input into the neutron signal converter 33. The neutron signal converter 33 converts the output signal from the power spectral density calculator 32 into the neutron measurement value, and the neutrons are measured based on this neutron measurement value.

The neutron signal converter 33 performs correction, concerned with the power spectral density, on a low-bandpass filter used for the sampling on the AD converter 25, the window function used for cutting out the finite number of signals for the FFT processing, and attenuation effect by the bandwidth limitation by the signal selecting device 31, and also corrects sensitivity of the neutron detector 21, thereby obtaining the neutron signal (neutron measurement value).

If the neutron measurement apparatus 10 of the first embodiment is used as the Campbell measurement apparatus employing the Campbell's method in the neutron measurement, and this Campbell measurement apparatus is equipped with the FFT calculation processing system 13, the signals in the frequency domain FFT-processed on the FFT device 29 are processed and filtered so as to remove the noise components therefrom, and thereafter, the signals are transmitted to the signal processing system 14.

The signal processing system 14 receives the calculation result of the FFT processing from the third recorder 30, and the signals having the frequency components corresponding to the frequency response characteristic in the analogue signal processing system 11 are selected and extracted on the signal selecting device 31. The signals selected and extracted on the signal selecting device 31 are subject to the square sum calculation on the power spectral density calculator 32, and thereafter, the calculated value is divided by the square value of the degree of the FFT, so as to obtain the power spectral densities. The power spectral densities are converted into the neutron signals (neutron measurement value) on the neutron signal converter 33.

In the neutron measurement apparatus 10 of the first embodiment, the signals in the frequency domain fast Fourier transform (FFT)-processed on the FFT device 29 of the FFT calculation processing system 13 are processed and filtered, and thereafter, it is unnecessary to apply the inverse fast Fourier transform (iFFT) to the signals in the frequency domain to be converted into the time domain on an inverse FFT device.

The FFT and iFFT processing requires tremendous calculation processing steps to be executed, but in this neutron measurement apparatus 10, it is unnecessary to perform the inverse FFT (iFFT) processing on the inverse FFT device. Accordingly, time lag due to the calculation for the iFFT can be eliminated, thereby enhancing the convenience of application to a real-time monitoring device such as the neutron measurement apparatus 10.

In the neutron measurement apparatus 10 of the first embodiment, it is unnecessary to implement both the FFT and iFFT of a higher order in the circuit substrates constituting the apparatus, so that the implementation of the iFFT can be eliminated, thereby enhancing the implementation to the circuit substrates constituting the apparatus. A gate array type element for performing calculation in the hardware logic (programmable logic device (PLD), or a field programmable gate array (FPGA)) has a smaller calculating logic capacity that can be implemented, compared to a microprocessor (MPU) or a digital-analogue processor (DSP), and thus it is quite difficult to implement both the FFT and the iFFT of the higher order. The present embodiment, however, eliminates the implementation of the iFFT, which enhances the implementability.

[Effects of First Embodiment]

According to the neutron measurement apparatus and the neutron measurement method of the first embodiment, since the FFT (fast Fourier transform) processing is applied to the Campbell measurement device for measuring the neutrons, after the signal in the time domain is converted into the signal in the frequency domain on the FFT device 29, it is unnecessary to perform the iFFT (inverse fast Fourier transform), which eliminates implementation of the calculation logic for performing the iFFT, thereby realizing the implementablity to a real time monitoring apparatus as the neutron measurement apparatus 10.

In the neutron measurement method in a conventional neutron measurement apparatus, the detector output signals in the time domain are detected, and are subjected to the analyzing calculation processing for monitoring, and if the frequency component of the neutron signal to be measured is close to the frequency component of a noise signal, it is difficult to avoid influences of the noise. To the contrary, in the measurement method of the neutron measurement apparatus of the present embodiment, if there is a slight difference between the frequency component of the neutron signal and the frequency component of the noise signal, it is possible to discriminate the frequency component of the noise signal, and remove this, thereby quickly obtaining the neutron measurement value in which influences of the noise signal are removed.

Second Embodiment

Figure 2:
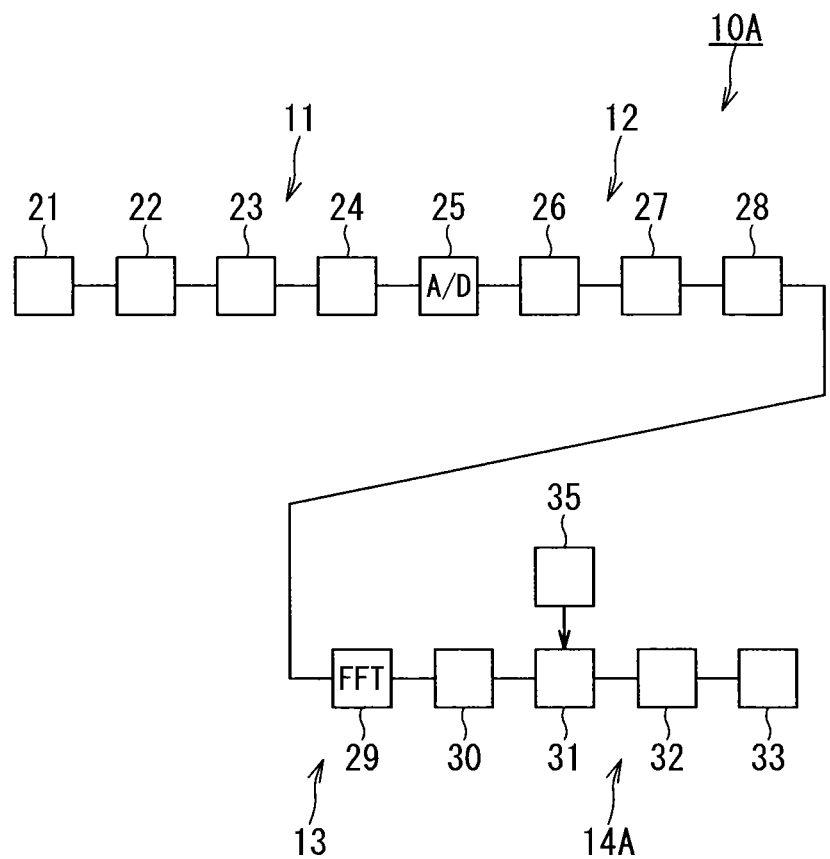
FIG. 2 is a schematic diagram showing a second embodiment of a neutron measurement apparatus and a neutron measurement method according to the present invention.

FIG. 2 is a schematic diagram showing a second embodiment of a neutron measurement apparatus and a measurement method.

The outline of the configuration of the neutron measurement apparatus and the measurement method exemplified in the second embodiment includes a signal processing system 14A that further includes a signal-selection range switching unit 35 in the signal processing system 14 of the first embodiment, and the other configurations are the same as those of the first embodiment; thus the same constituent elements and operations are designated with the same numeral references, and their redundant description will be omitted or simplified.

The neutron measurement apparatus 10A of the second embodiment is configured to convert the signals in the time domain into the signals in the frequency domain through the fast Fourier transform (FFT) on the FFT device 29, and thereafter, select the selection range of the signals in the frequency domain on the signal-selection range switching unit 35, and execute the processing to change the selection range on the signal selecting device 31. The signal selecting device 31 is configured to allow the signal selection range of the FFT-processed signal in the frequency domain to be variable, and the neutron signal converter 33 is configured to correct the signals in accordance with the selected frequency range.

[Operation]

In the neutron measurement apparatus 10A of the second embodiment, it is exemplified that the FFT-processed signal on the FFT device 29 of the FFT calculation processing system 13 is calculated (counted) in the frequency domain, and in order to measure the neutron signals, the analogue signal processing system 11 including the neutron detector 21, the preamplifier 22, the AC amplifier 23, and the analogue filter device 24 as well as cables connecting them is defined as an analogue measuring circuit, and the output signal from the analogue measuring circuit 11 is input through the digitizing processing system 12 into the FFT calculation processing system 13. In the FFT calculation processing system 13, the FFT device 29 converts the signals into the signals in the frequency domain corresponding to the frequency band of the output signal from the analogue measuring circuit 11. After the FFT conversion, the signal selecting device 31 selects and extracts the coefficient (count) of the frequency range corresponding to the frequency band in the analogue measuring circuit 11.

If the signal selecting device 31 selects a frequency range that is narrower than the frequency band of the output signals of the analogue measuring circuit 11 in the signal processing system 14, in order to obtain the correct neutron signal value, the neutron signal converter 33 is configured to multiply a correction coefficient to correct amount of the output signal of the analogue measuring circuit 11, which corresponds to the range missed by narrowing the selected frequency range.

The correction efficient is determined based on the area ratio of the range missed by narrowing the frequency range, relative to the area of the frequency domain in which the frequency response characteristics of the output signals from the analogue measuring circuit 11 are plotted.

[Effect of Second Embodiment]

According to the neutron measurement apparatus and the neutron measurement method of the second embodiment, even if the frequency of the noise signal included in the detector output signal from the neutron detector 21 is overlapped with the frequency of the neutron signal that is the measurement target, the coefficient (count) of the FFT-processed signal that corresponds to the frequency of the overlapped noise signal is removed, thereby preventing bad influences of the noise signal on the neutron signal measurement. The removed frequency range is corrected in the manner as described in the operation of the second embodiment, thereby representing the correct neutron measurement value as the result of the neutron measurement.

Third Embodiment

Figure 3:
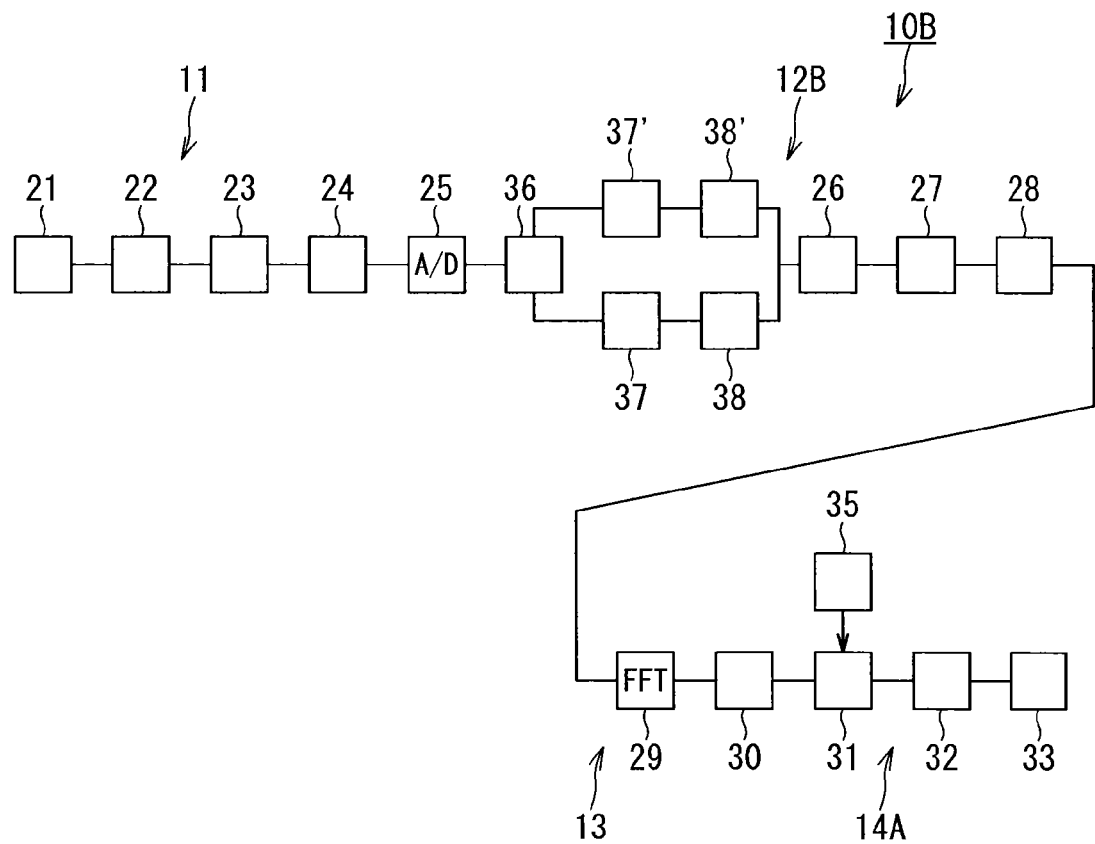
FIG. 3 is a schematic diagram showing a third embodiment of a neutron measurement apparatus and a neutron measurement method according to the present invention.

FIG. 3 is a schematic diagram showing a third embodiment of a neutron measurement apparatus and a measurement method.

In the description of the neutron measurement apparatus 10B exemplified in the third embodiment, the same constituent elements as those of the neutron measurement apparatus 10 exemplified in the first embodiment are designated with the same numeral references and their redundant description will be omitted or simplified. The signal processing system of the neutron measurement apparatus 10B of the third embodiment has the same constituent elements as the signal processing system 14A of the neutron measurement apparatus 10A of the second embodiment, and these same constituent elements are designated with the same numeral references, and their redundant description will be omitted or simplified.

A digitizing processing system 12B of the neutron measurement apparatus 10B of the third embodiment has a different configuration from that of the digitizing processing system 12 of the first embodiment. The digitizing processing system 12B of the third embodiment includes a selecting device 36 for selecting a sampling frequency (a lowpass filter frequency and resampling frequency), and lowpass filters 37, 37' and resampling devices 38, 38' of plural systems, so as to re-sample data (output signals) sampled on the AD converter 25 at a lower sampling frequency, as shown in FIG. 3.

In the neutron measurement apparatus 10B of the third embodiment, the sampling frequency is selected from the output signals of the AD converter 25 on the selecting device 36, and a frequency ½ lower than the sampling frequency of the AD converter 25 is defined as the cut-off frequency. The neutron measurement apparatus 10B further includes the lowpass filters 37 (37') for removing signals having the frequency equal to or more than this cut-off frequency, and the resampling devices 38 (38') for resampling the output signals from the lowpass filters 37 (37') at a frequency not less than twice the cut-off frequency. Each resampling device 38 (38') functions for decreasing the sampling period (down-sampling), and has a downsizing function of the sampling device.

The neutron measurement apparatus 10B of the third embodiment further includes a resampling frequency selecting device (not shown) for selecting the resampling frequency, a lowpass filter (not shown) having the cut-off frequency corresponding to the resampling frequency selected on the resampling frequency selecting device, along with the resampling devices 38 (38') of the digitizing processing system 12B. The neutron measurement apparatus 10B further includes the signal-selection range switching unit 35 for changing the selecting range of the FFT-processed signals selected on the signal selecting device 31, based on the lowpass filter and the resampling frequency selecting device for selecting the resampling frequency, and also based on the resampling frequency selected on this resampling frequency selecting device.

[Operation]

In the neutron measurement apparatus 10B of the third embodiment, in order to further resample the data, which is once sampled on the AD converter 25, at a lower sampling frequency, the frequency components equal to ½ or more of the resampling frequency is removed through each lowpass filter 37 (37'). In the case of changing the sampling frequency on the resampling frequency selecting device 36, the change in correspondence between the FFT-processed signal and the frequency range of the neutron signal can be adjusted on the signal-selection range switching unit 35.

[Effect of Third Embodiment]

In the neutron measurement apparatus 10B of the third embodiment, in the case of measuring the neutron signals in the same time range, if the signals are resampled at a lower sampling frequency than the sampling frequency of the AD converter 25, it is possible to apply the FFT calculating logic having a lower FFT degree to the neutron measurement, thereby enhancing the implementability to the monitoring device (i.e. neutron measurement apparatus 10B).

Since the resampling frequency is configured to be selectable, the time range where the FFT is performed becomes variable in the FFT processing having the same degree. Accordingly, it is possible to select responsivity relative to the standard deviation due to the static fluctuation of the measured neutron signals or the variations of the neutron signals.

It becomes possible to select the frequency range for observation in the frequency domain; therefore, it is possible to select an appropriate frequency range in accordance with the frequency of the neutron signal of the measurement target. Specifically, if it is desired to observe quicker change in the neutron signal, it is possible to set the sampling frequency to be higher, so as to set the upper limit of the frequency for the observation to be higher; and if it is desired to observe slower change in the neutron signal, it is possible to set the sampling frequency to be lower, so as to set the lower limit of the frequency for the observation to be lower.

Fourth Embodiment

Figure 4:
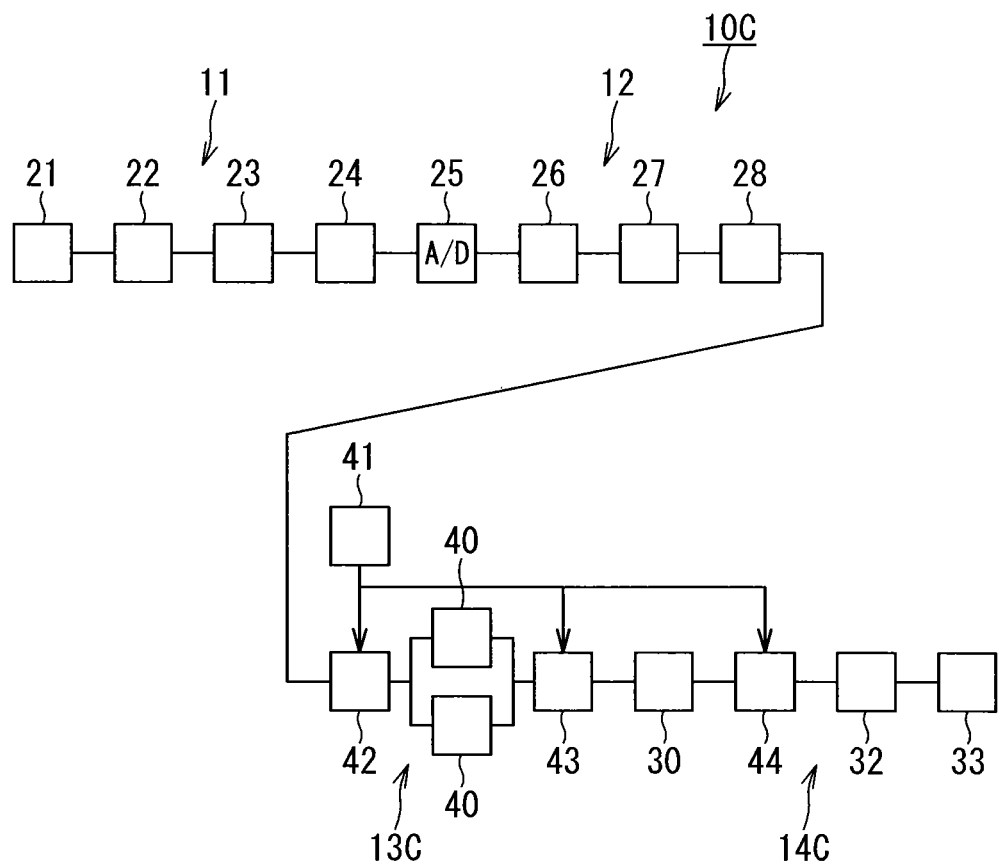
FIG. 4 is a schematic diagram showing a fourth embodiment of a neutron measurement apparatus and a neutron measurement method according to the present invention.

FIG. 4 is a schematic diagram showing a fourth embodiment of a neutron measurement apparatus and a neutron measurement method.

In the description of the neutron measurement apparatus 10C exemplified in the fourth embodiment, the same constituent elements as those of the neutron measurement apparatus 10 exemplified in the first embodiment are designated with the same numeral references and their redundant description will be omitted or simplified.

A FFT calculation processing system 13C and a signal processing system 14C of the neutron measurement apparatus 10C of the fourth embodiment have different configurations from those of the neutron measurement apparatus 10 of the first embodiment.

The FFT calculation processing system 13C of the neutron measurement apparatus 10C exemplified in FIG. 4 includes plural FFT calculating logics 40, 40, and also includes an FFT degree selecting unit 41 for selecting the degree for the FFT processing to be performed, an FFT logic selecting unit 42 for selecting the FFT calculating logics 40, 40 depending on the FFT degree selected on the FFT degree selecting unit 41, an FFT calculation result selecting device 43 for selecting the calculation result of the plural FFT calculating logics 40, 40, and a signal selecting device 44 for selecting and extracting only the signals having the required frequency components from the FFT calculation result depending on the FFT degree selected on the FFT degree selecting unit 41.

[Operation]

In the neutron measurement apparatus 10C of the fourth embodiment, the plural FFT calculating logics 40, 40 are implemented to the neutron measurement apparatus 10C in advance, and the FFT logic selecting unit 42 selects the FFT calculating logics 40, 40 to be performed depending on the FFT degree selected on the FFT degree selecting unit 41. A change in correspondence between the FFT-processed signal and the frequency range of the neutron signal, which is generated due to change in the FFT degree, is adjusted on the signal selecting device 44.

[Effect of Fourth Embodiment]

In the neutron measurement apparatus 10C of the fourth embodiment, since the time range for the measurement is changed due to change in the degree of the FFT if the same sampling frequency is used, it is possible to change the accuracy or the responsivity of the measurement result of the neutron signal. Specifically, as the FFT degree is increased and the time range for the measurement becomes increased, it is possible to enhance the accuracy of the measurement result of the neutron signal, but the responsivity thereof becomes delayed at the same time. As the FFT degree is decreased and the time range for the measurement becomes decreased, it is possible to enhance the responsivity of the measurement result of the neutron signal, but the accuracy thereof becomes deteriorated at the same time.

Accordingly, by configuring the FFT degree to be selectable, it is possible to select appropriate accuracy and responsivity depending on the purpose of the measurement of the neutron signal. Increase in the FFT degree at the same sampling frequency allows the neutron observation even at lower frequencies in the frequency domain.

Fifth Embodiment

Figure 5:
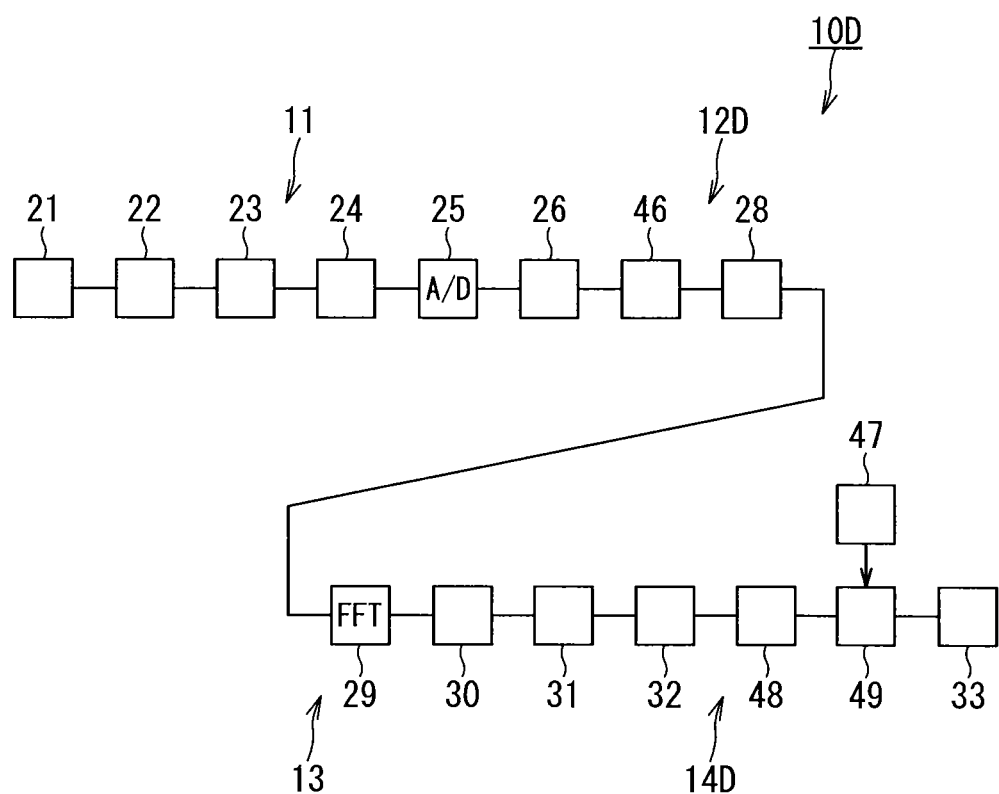
FIG. 5 is a schematic diagram showing a fifth embodiment of a neutron measurement apparatus and a neutron measurement method according to the present invention.

FIG. 5 is a schematic diagram showing a fifth embodiment of a neutron measurement apparatus and a neutron measurement method.

In the description of the neutron measurement apparatus 10D exemplified in the fifth embodiment, the same constituent elements as those of the neutron measurement apparatus 10 exemplified in the first embodiment are designated with the same numeral references and their redundant description will be omitted or simplified.

The neutron measurement apparatus 10D of the fifth embodiment has different configurations of a part of a digitizing processing system (window function multiplier 46) and a signal processing system from those of the neutron measurement apparatus 10 of the first embodiment. The window function multiplier 46 of the digitizing processing system 12D reads out a certain number of the digital signals that are recorded on the first recorder 26, and multiplies these signals by the window function coefficients, and the window function multiplier 46 has a function of reading out the data (a certain number of the digital signals) while shifting the FFT degree half by half. The window function multiplier 46 applies the window function multiplying calculation to the data read out from the first recorder 26 while shifting the FFT degree half by half.

The signal processing system 14D of the neutron measurement apparatus 10D includes an accuracy-or-responsivity selecting unit 47 for selecting accuracy, a standard deviation, or responsivity of the measurement result of the neutron signal, and a fourth recorder 48 for recording the plural output signals from the power spectral density calculator 32, and also includes a weighted mean calculator 49 for applying the weighted mean calculation to the plural output signals from the power spectral density calculator 32 depending on the output from the accuracy-or-responsivity selecting unit 47.

[Operation]

In the digitizing processing system 12D of the neutron measurement apparatus 10D of the fifth embodiment, it is configured that the FFT degree is equalized to the number of the window function coefficients. The window function multiplier 46 multiplies the data which is sequentially sampled in the time series by the AD converter 25, and read out from the first recorder 26 by the window function while shifting the FFT degree half by half, by the window function.

The data multiplied by the window function on the window function multiplier 46 of the digitizing processing system 12D is calculated through the FFT having a lower degree on the FFT device 29 of the FFT calculation processing system 13, and the calculation result of the FFT is input into the signal selecting device 31 of the signal processing system 14D. Based on the calculation result from the signal selecting device 31 of the signal processing system 14D, plural power spectral densities are obtained from the calculation on the power spectral density calculator 32, and these power spectral densities are recorded on the fourth recorder 48. The weighted mean calculation is then applied to these plural power spectral densities on the weighted mean calculator 49, so as to obtain a value equivalent to the power spectral density acquired by applying a single FFT processing having a higher degree to the data in the same time range. The number of the power spectral densities to be subjected to the weighted mean calculation on the weighted mean calculator 49 is set to be variable depending on the accuracy, the standard deviation, or the responsivity selected on the accuracy-or-responsivity selecting unit 47.

[Effect of Fifth Embodiment]

According to the neutron measurement apparatus and the neutron measurement method of the fifth embodiment, even if the FFT having a lower degree is used, the weighted mean calculation is applied to the plural power spectral densities obtained through the FFT having a lower degree, thereby obtaining a value equivalent to the power spectral density acquired through a single FFT calculation using a higher degree.

The plural power spectral densities are obtained from the data in a shorter time range through the FFT calculation using a lower degree, and the weight mean calculation is applied to these power spectral densities, so as to acquire a value equivalent to the power spectral density obtained from the data in a longer time range through the FFT calculation using a higher degree. Accordingly, it is possible to enhance implementabilty to the monitoring device by using a smaller safety logic of the FFT, and also enhance responsivity of the neutron signal measurement by reducing the execution time of the FFT calculation, thereby enhancing the measurement accuracy by allowing the neutron signal measurement in a longer time. In addition, since the number of the power spectral densities used in the weighted mean calculation is set to be variable, the accuracy or the responsivity of the neutron signal measurement becomes selectable.

[Variation of Fifth Embodiment]

Figure 6:
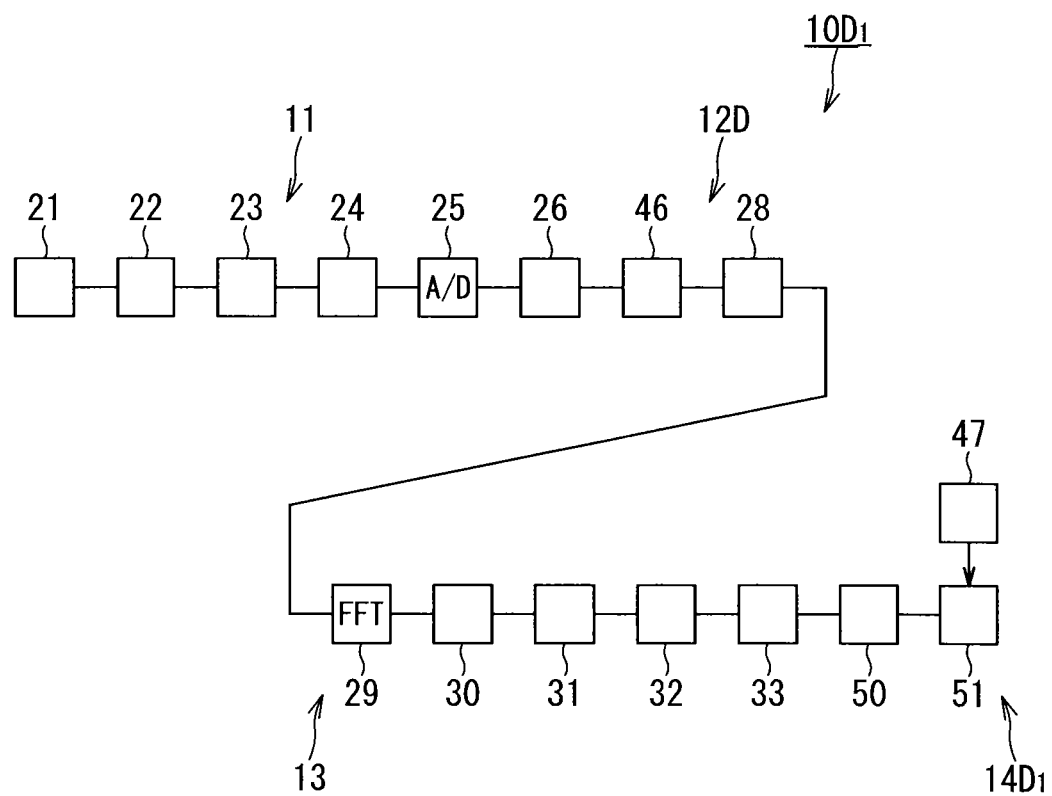
FIG. 6 is a schematic diagram showing a variation of the fifth embodiment of a neutron measurement apparatus and a neutron measurement method according to the present invention.

FIG. 6 is a schematic diagram showing a variation of the fifth embodiment of a neutron measurement apparatus and a measurement method.

In the description of the neutron measurement apparatus $10D_1$ exemplified in the present variation, the same constituent elements as those of the neutron measurement apparatus 10D exemplified in the fifth embodiment are designated with the same numeral references and their redundant description will be omitted or simplified.

The neutron measurement apparatus $10D_1$ of the variation exemplified in FIG. 6 has a different configuration of a signal processing system from that of the neutron measurement apparatus 10D of the fifth embodiment. The signal processing system $14D_1$ of the neutron measurement apparatus $10D_1$ exemplified in the variation of the fifth embodiment includes the accuracy-or-responsivity selecting unit 47 for selecting accuracy or responsivity of the measurement result of the neutron signals, a fifth recorder 50 for recording plural output signals from the neutron signal converter 33, and a weighted mean calculator 51 for applying the weighted mean calculation to plural output signals from the neutron signal converter depending on the selection result of the accuracy-or-responsivity selecting unit 47 in addition to the signal selecting device 31, the power spectral density calculator 32, and the neutron signal converter 33.

[Operation]

In the neutron measurement apparatus $10D_1$ of the variation of the fifth embodiment, data multiplied by the window function on the window function multiplier 46 is subjected to the FFT calculation with a lower degree on the FFT device 29 of the FFT calculation processing system 13, and the signal selecting device 31 of the signal processing system $14D_1$ records on the fifth recorder 50 the plural power spectral densities or the plural values of the neutron signals, which are obtained from the FFT calculation. The weighted mean calculation is applied to the plural power spectral densities or the plural values of the neutron signals on the weighted mean calculator 51, so as to acquire a value equivalent to a value of the power spectral density or of the neutron signal obtained by applying a single FFT processing having a higher degree to the data in the same time range. The number of the power spectral densities or of the neutron signals to be subjected to the weighted mean calculation on the weighted mean calculator 51 is set to be variable depending on the accuracy or the responsivity selected on the accuracy-or-responsivity selecting unit 47.

[Effect of Variation of Fifth Embodiment]

According to the variation of the fifth embodiment, even if the FFT having a lower degree is used, the weighted mean calculation is applied to the plural power spectral densities or the plural neutron signals obtained through the FFT having a lower degree, thereby obtaining a value equivalent to the power spectral density or the neutron signal acquired through a single FFT calculation using a higher degree.

The plural power spectral densities or the plural neutron signals are obtained from the data in a shorter time range through the FFT calculation using a lower degree, and the weight mean calculation is applied to these power spectral densities or the neutron signals, so as to acquire a value equivalent to the power spectral density or the neutron signal obtained from the data in a longer time range through the FFT calculation using a higher degree. Accordingly, it is possible to enhance implementabilty to the monitoring device by using a smaller safety logic of the FFT, and also enhance responsivity of the neutron signal measurement by reducing the execution time of the FFT calculation, thereby enhancing the measurement accuracy by allowing the neutron signal measurement in a longer time.

In addition, since the number of the power spectral densities or of the neutron signals used in the weighted mean calculation is set to be variable, the accuracy or the responsivity of the neutron signal measurement becomes selectable.

Sixth Embodiment

Figure 7:
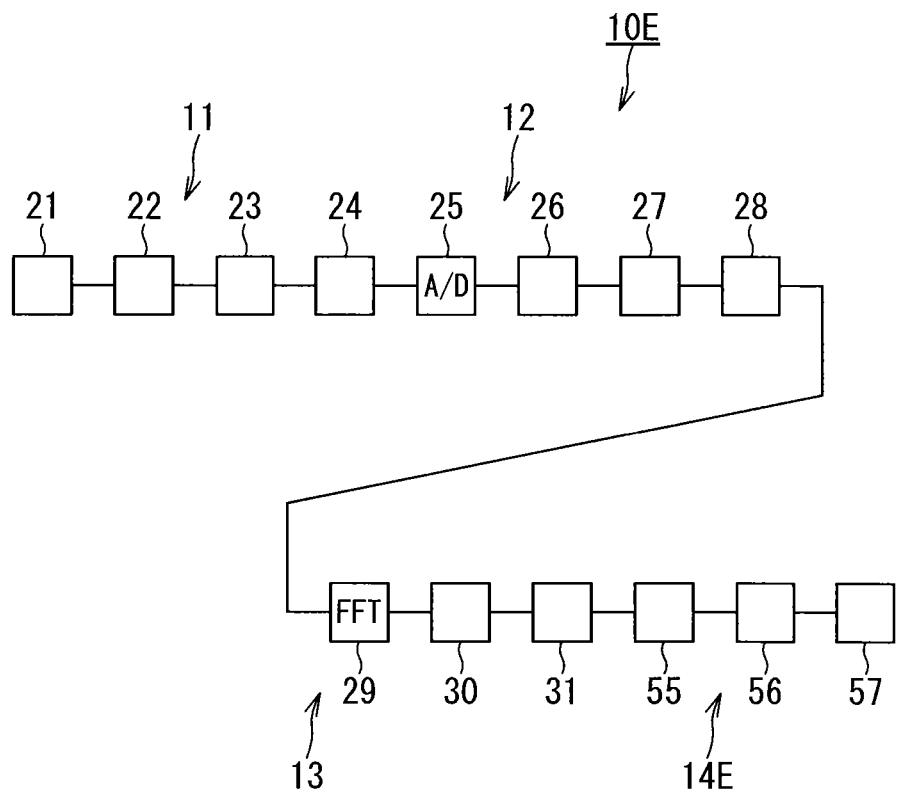
FIG. 7 is a schematic diagram showing a sixth embodiment of a neutron measurement apparatus and a neutron measurement method according to the present invention.
Figure 8:
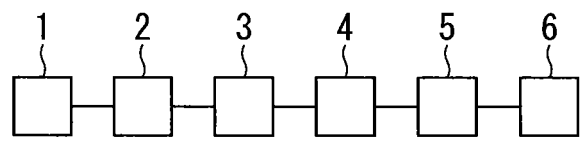
FIG. 8 is a schematic diagram showing a conventional neutron measurement apparatus and a conventional neutron measurement method.

FIG. 7 is a schematic diagram showing a sixth embodiment of a neutron measurement apparatus and a measurement method.

In the description of the neutron measurement apparatus 10E exemplified in the sixth embodiment, the same constituent elements as those of the neutron measurement apparatus 10 exemplified in the first embodiment are designated with the same numeral references and their redundant description will be omitted or simplified.

The neutron measurement apparatus 10E shown in FIG. 7 has the same configuration of applying the signal processing using the FFT to the neutron measurement as that of the neutron measurement apparatus 10 of the first embodiment, but has a different configuration of a signal processing system from the signal processing system 14 subsequent to the FFT processing on the FFT calculation processing system 13 of the neutron measurement apparatus 10 of the first embodiment.

In the neutron measurement apparatus 10E of the sixth embodiment, the signals are FFT-processed on the FFT device 29 of the FFT calculation processing system 13 into the signals in the frequency domain, and the filtering required in the frequency domain is applied to the FFT-processed signals so as to remove the noise components therefrom, and these signals are then recorded on the third recorder 30.

After the FFT processing on the FFT device 29 and the necessary filtering, the obtained data is subjected to the inverse Fourier transform (iFFT) processing on an iFFT device 55 of the signal processing system 14E, so as to convert the signals in the frequency domain into the signals in the time domain, and then the signals in the time domain are stored on a sixth recorder 56.

In addition to the inverse FFT device 55 and the sixth recorder 56, the signal processing system 14E of the neutron measurement apparatus 10E further includes a root mean square calculator 57 for applying the root mean square calculation to the converted signals in the time domain, so as to obtain the neutron measurement value.

[Operation]

In the neutron measurement apparatus and the neutron measurement method of the sixth embodiment, the detector output signals (analogue signals) detected on the neutron detector 21 are processed on the analogue signal processing system 11, and the sampled signals in the time domain are then converted into the digital signals on the digitizing processing system 12.

The digital signals in the time domain processed on the digitizing processing system 12 are transmitted to the FFT calculation processing system 13, and are FFT-processed on the FFT device 29, so as to be converted into the signals in the frequency domain. The filtering required in the frequency domain is applied to the digital signals in the frequency domain on the FFT device 29, so as to remove the noise components therefrom, and thereafter, the inverse fast Fourier transform (iFFT) is applied to the filtered digital signals in the frequency domain on the iFFT device 55 of the signal processing system 14E, so as to be converted into the signals in the time domain. The signals in the time domain after iFFT-processed on the iFFT device 55 is subjected to the root mean square calculation on the root mean square calculator 57, so as to obtain the neutron measurement value. Accordingly, even if the signals in the time domain after iFFT-processed on the iFFT device 55 is subjected to the root mean square calculation on the root mean square calculator 57, noise signals having high frequency noise components can be prevented from being mixed, so that it is possible to obtain the neutron measurement value in which the noise components are removed, thereby realizing the accurate neutron measurement.

[Effect of Sixth Embodiment]

In the case of applying the FFT calculation processing system 13 to the neutron measurement apparatus (Campbell measurement device) 10E for use in the neutron measurement, it is possible to process and filtering-process the signal in the frequency domain after FFT processed on the FFT device 29, so as to remove the noise components therefrom, and thereafter apply the iFFT (inverse fast Fourier transform) processing to the signals in the frequency domain on the iFFT device 55 so as to convert them into the signals in the time domain, and then apply the root mean square calculation to the converted signals in the time domain on the root mean square calculator 57, thereby realizing the accurate neutron measurement with the noise components removed.

The neutron measurement apparatus of the present embodiment has been described by using an example of providing the recorders in the digitizing processing system, the FFT calculation processing system, and the signal processing system, respectively, but it is not always necessary to provide these recorders if each of the digitizing processing system, the FFT calculation processing system, and the signal processing system has a buffer function.

Various parameters (sampling period, FFT constant or degree, selection range/selection method in the frequency band (continuous, discrete, or selecting/excluding a particular frequency), weighted mean value, measurement accuracy, or responsivity, etc.) that are configurable in each embodiment may have great flexibility, and part of the parameters may be set to be configurable, fixed, or automatically configurable, and a function of displaying the configuration status of these parameters may be provided; and the above may also be included in the technical scope of the present invention.

What is claimed is:

1. A neutron measurement apparatus comprising:
    an analogue signal processing system configured to amplify alternating current components of detector output signals output from a neutron detector, and to apply filtering to remove high frequency components from the output signals;
    a digitizing processing system configured to digitize the output signals output from the analogue signal processing system at a constant sampling period in a time series;
    a FFT calculation processing system configured to convert a certain number of the signals in a time domain output from the digitizing processing system into signals in a frequency domain, and to apply filtering to the signals in the frequency domain; and
    a signal processing system configured to select and extract signals having required frequency components through the calculation processing on the FFT calculation processing system, so as to calculate power spectral densities of the extracted signals, and to convert the calculated power spectral densities into a neutron measurement value.

2. The neutron measurement apparatus according to claim 1, wherein
    the FFT calculation processing system includes an FFT device configured to apply fast Fourier transform processing to the signals in the time domain output from the digitizing processing system, so as to convert the signals in the time domain into the signals in the frequency domain.

3. The neutron measurement apparatus according to claim 1, wherein
    the signal processing system includes:
    a signal selecting device configured to select and extract the signals having required frequency components based on a calculation result of the FFT calculating processing system;
    a power spectral density calculator configured to calculate the power spectral densities of the signals selected and extracted on the signal selecting device; and
    a neutron signal converter configured to convert the power spectral densities into a neutron measurement value.

4. The neutron measurement apparatus according to claim 1, wherein
    the signal processing system includes an accuracy-or-responsivity selecting unit having a function of selecting a standard deviation or responsivity of a neutron measurement result, and
    the signal processing system has a function to apply a weighted mean calculation on a weighted mean calculator to plural power spectral densities calculated on the power spectral density calculator based on the selected standard deviation or responsivity, or to plural neutron measurement values output from the neutron signal converter.

5. A neutron measurement apparatus comprising:
    a preamplifier configured to amplify detector output signals from a neutron detector;
    an AC amplifier configured to amplify alternating current components of the signals output from the preamplifier;

an analogue filter device configured to remove high frequency components from the signals output from the AC amplifier;

an AD converter configured to AD-convert the output signals from the analogue filter device at a constant sampling period into digital signals;

a recorder configured to record the digital signals converted on the AD converter;

a window function multiplier configured to read out a certain number of the digital signals from the recorder, and to multiply the digital signals by window function coefficients;

an FFT device configured to apply fast Fourier transform processing to the output signals from the window function multiplier;

a signal selecting device configured to select and extract only signals having required frequency components based on a calculation result of the FFT device;

a power spectral density calculator configured to calculate power spectral densities of the signals selected and extracted on the signal selecting device; and a neutron signal converter configured to convert the output signals from the power spectral density calculator into a neutron measurement value.

6. The neutron measurement apparatus according to claim 5, wherein a frequency range selected by the signal selecting device is set to be variable, and the neutron signal convertor performs correction depending on the selected frequency range.

7. The neutron measurement apparatus according to claim 6, wherein if such FFT-processed signals are removed that correspond to a frequency band including part of a frequency response characteristic range of any measurement system from the neutron detector before the signals are converted into the digital signals, the neutron signal converter performs correction corresponding to the part of frequency response characteristic of the measurement system included in the removed frequency band.

8. The neutron measurement apparatus according to claim 5, wherein the neutron measurement apparatus includes a lowpass filter, and a down-sampling device for decreasing a sampling period in a step subsequent to the AD converter, so as to allow the sampling period to be variable, and also allow a selecting range of the FFT-processed signals in the frequency domain to be changeable, wherein the selecting range is selected on the signal selecting device depending on the sampling period.

9. The neutron measurement apparatus according to claim 4, wherein the FFT device is configured to:

allow a number of digital signals to be fast Fourier transform (FFT)-processed to be variable;

allow a selecting range of the FFT-processed signals in the frequency domain to be changeable, wherein the selecting range is selected on the signal selecting device depending on the selected number of the digital signals; and correct the neutron measurement value on the neutron signal converter depending on the FFT-processed signals in the frequency domain selected on the signal selecting device.

10. The neutron measurement apparatus according to claim 5, wherein the signal processing system includes an accuracy-or-responsivity selecting unit having a function of selecting a standard deviation or responsivity of a neutron measurement result, and the signal processing system has a function to apply a weighted mean calculation on a weighted mean calculator to plural power spectral densities calculated on the power spectral density calculator based on the selected standard deviation or responsivity, or to plural neutron measurement values output from the neutron signal converter.

11. The neutron measurement apparatus according to claim 1, wherein the signal processing system:

includes all or a part of constituent elements of claim 6 to claim 10;

has a function of selecting at least one of parameters including a resampling period, a degree of the FFT, a number of the power spectral densities or of the neutron measurement values to be subjected to the weighted mean calculation, and a standard deviation or responsivity of a neutron measurement result; and has a function of setting unselectable parameters to be fixed or automatically selectable, and displaying parameters automatically selected.

12. The neutron measurement apparatus according to claim 5, wherein the signal processing system:

includes all or a part of constituent elements of claim 6 to claim 10;

has a function of selecting at least one of parameters including a resampling period, a degree of the FFT, a number of the power spectral densities or of the neutron measurement values to be subjected to the weighted mean calculation, and a standard deviation or responsivity of a neutron measurement result; and has a function of setting unselectable parameters to be fixed or automatically selectable, and displaying parameters automatically selected.

13. A neutron measurement method comprising:

amplifying alternating current components of detector output signals output from a neutron detector, and applying filtering to the output signals to remove high frequency components from the output signals on an analogue signal processing system;

digitizing the processed detector output signals at a constant sampling period in a time series on a digitizing processing system;

applying fast Fourier transform (FFT) processing to the digitized signals in a time domain to convert the signals into signals in a frequency domain on an FFT calculation processing system, and applying filtering to the FFT-processed signals in the frequency domain; and selecting and extracting signals having required frequency components from the FFT-processed signals in the frequency domain, so as to calculate power spectral densities of the extracted signals, and obtain a neutron measurement value based on the power spectral densities of the extracted signals.

* * * * *

UNITED STATES PATENT AND TRADEMARK OFFICE
CERTIFICATE OF CORRECTION

PATENT NO. : 8,878,139 B2  
APPLICATION NO. : 13/780516  
DATED : November 4, 2014  
INVENTOR(S) : Shigehiro Kono et al.

Page 1 of 1

It is certified that error appears in the above-identified patent and that said Letters Patent is hereby corrected as shown below:

On the title page, Item (30), the Foreign Application Priority Data has been omitted. Item (30) should read:

-- (30)      Foreign Application Priority Data

Feb. 29, 2012      (JP) .................................2012-043995 --

Signed and Sealed this  
Seventeenth Day of March, 2015

Michelle K. Lee  
*Director of the United States Patent and Trademark Office*